United States Patent
Epstein

(10) Patent No.: US 6,847,949 B1
(45) Date of Patent: Jan. 25, 2005

(54) INDICATOR SYSTEM FOR SCREENING PROTECTED MATERIAL

(75) Inventor: Michael Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/408,788

(22) Filed: Sep. 30, 1999

Related U.S. Application Data

(60) Provisional application No. 60/133,377, filed on May 10, 1999.

(51) Int. Cl.$^7$ .............................................. G06F 17/60
(52) U.S. Cl. ............................................. 705/57; 705/1
(58) Field of Search ............................... 705/1, 57, 58, 705/59; 717/168–178

(56) References Cited

U.S. PATENT DOCUMENTS

| | | | |
|---|---|---|---|
| 5,181,196 A | | 1/1993 | Matsueda ..................... 369/48 |
| 5,418,852 A | | 5/1995 | Itami et al. ..................... 380/4 |
| 5,450,489 A | * | 9/1995 | Ostrover et al. .............. 705/51 |
| 5,822,432 A | * | 10/1998 | Moskowitz et al. .......... 380/28 |
| 5,845,077 A | * | 12/1998 | Fawcett ....................... 709/221 |
| 5,886,979 A | | 3/1999 | Moribe et al. ........... 369/275.3 |
| 5,905,800 A | * | 5/1999 | Moskowitz et al. .......... 380/28 |
| 5,940,135 A | * | 8/1999 | Petrovic et al. ............. 341/139 |
| 6,199,204 B1 | * | 3/2001 | Donohue ..................... 705/59 |
| 6,330,672 B1 | * | 12/2001 | Shur .......................... 713/176 |

FOREIGN PATENT DOCUMENTS

| | | | |
|---|---|---|---|
| EP | 0716544 A2 | 12/1995 | .......... H04N/5/913 |
| EP | 0791923 A2 | 1/1997 | ........... G11B/20/00 |
| EP | 0801385 A2 | 11/1997 | ........... G11B/20/00 |
| US | WO 01/93021 | * 12/2001 | ............. G06F/9/00 |
| WO | WO9743761 | 5/1997 | ........... G11B/20/00 |

OTHER PUBLICATIONS http://www.sdmi.org/download/port_device_spec_part1.pdf , 1998 all pages.*

* cited by examiner

Primary Examiner—James P. Trammell
Assistant Examiner—John M Winter
(74) Attorney, Agent, or Firm—Edward W. Goodman

(57) ABSTRACT

Copy-protected content material is screened for an indication of the availability of an enhanced version of a screening system and forcing an upgrade to the advanced screening system by refusing to process the copy-protected content material until the upgrade is preformed. When security standards change, and corresponding security techniques are available for downloading to existing consumer devices, newly published content material will contain an indication to that effect. When the newly published content material is processed by an existing consumer device, the consumer device will detect this indication of an available update, and will prevent the processing of this newly published content material until the update is received. In this manner, a phased approach to enhanced security can be effected.

8 Claims, 3 Drawing Sheets

INDICATOR SYSTEM FOR SCREENING PROTECTED MATERIAL

CROSS-REFERENCE TO RELATED APPLICATIONS

This application claims the benefit of U.S. Provisional Application No. 60/133,377, filed May 10, 1999.

BACKGROUND OF THE INVENTION

1. Field of the Invention

This invention relates to the field of consumer electronics, and, in particular, to screening techniques for copy-protected material.

2. Description of the Related Art

Digital recordings have the unique property that copies of the content material have the same quality as the original. As such, the need for an effective copy-protection scheme is particularly crucial for the protection of content material that is digitally recorded. A number of protection schemes have been developed (or proposed) that record the content material in an encrypted form. Other protection schemes have been developed (or proposed) that record an encrypted key that controls the playback, or rendering, of the content material. In a number of these approaches, an attempt is made to minimize the value, or worth, of an illicit copy of copy-protected material by incorporating screens, or filters, in playback or recording devices that prevent the rendering or recording of these illicit copies. Because many alternative techniques are currently available, and because many other alternative techniques are being developed, the adoption of a single protection scheme by the providers of copy-protected material and the vendors of consumer electronic devices has been, and continues to be, a daunting task.

The Secure Digital Music Initiative (SDMI) has proposed a phased approach to enhanced methods of screening for illicit copies of copy-protected material. That is, because most security systems are embodied in programming code, it is relatively easy to upgrade a security system to effect alternative security measures as these measures are developed and standardized. Such an upgrade can be accomplished by sending a replacement memory device to a user, by having the user download the new programming code from an Internet site, and so on. Initially, for example, copy-protected material will contain an indication, or mark, that it is copy-protected material, or, in some cases, a mark that indicates that the material has been tampered with. For example, a mark may indicate that the content material has been converted to a compressed format when it should not have been compressed. A compliant player will not play content material that contains such a mark but does not contain the appropriate SDMI authorization. For ease of reference, content material that does not contain the appropriate SDMI authorization for the content material is termed Non-SDMI, or NSDMI. Also, for ease of understanding, the SDMI approach is used herein as a paradigm for security systems that utilize a phased approach to protection schemes.

A conventional SDMI screening process 100 is illustrated in FIG. 1. User material 101 is received by the process 100, and tested to determine whether it is material that has an appropriate SDMI authorization. If so, the SDMI material is provided to the processing components of the player or recorder, labeled "SDMI Functions" 120, in FIG. 1. These SDMI functions 120 process the material and provide the intended output 121 associated with the device; that is, a player renders the material via acoustic devices, a recorder records the material, typically in a secure form, on another medium, such as a recordable CD, and the like.

If, at 110, the material 101 does not contain the appropriate SDMI authorization, it is screened for a mark, at 130. If the material 101 does not contain the aforementioned mark, it is deemed not to be copy-protected material, and, therefore, freely playable or recordable. For example, copy-protected material may be marked using a "watermark" that cannot be removed from the material without destroying, or significantly degrading, the quality of the material. If a watermark is not detected at 130, it is likely that the user material 101 is not copy-protected. Such material may be commercial material that has been provided before the use of a watermark is adopted, or material, such as, private recordings or other recordings, that are intentionally not copy-protected. If, at 130, a mark is not found, the material 101 is processed, at 170, to be SDMI-compatible, for subsequent rendering or other processing, via the SDMI functions 120. Other security tests, such as commonly used existing copy-protection tests, may also be applied in block 130 to determine the validity of the user material 101. Similarly, the SDMI functions 120 may also include further protection-providing functions that are used to determine whether the output 121 is provided.

If, at 140, the material 101 is determined to be illicit, or potentially illicit, the state of the process 100 is assessed to determine whether it contains phase II security screens. That is, the aforementioned security mark will contain an indication that phase II security screens are available. When illicit copies of the content material containing this mark are made, they will also contain the mark. Thus, when the user of the illicit copy attempts to play or record from this illicit copy, the test at 140 will detect this indication, and will advise the user, at 150, that there's a problem rendering the user material 101, and will further advise the user that an upgrade is available for the user's system. When the user upgrades the user's system in response to this advice, advanced screening techniques are provided, as illustrated by block 160. That is, when the user upgrades to the Phase II system, the block 160 is provided or upgraded, via a memory device upgrade, a download from an Internet site, and so on. Other blocks, such as the SDMI functions block 120, the mark detection block 130, and the pre-processing block 170 may also be enhanced or modified by the upgrade. Thereafter, subsequent attempts to render or otherwise process illicit material will be subject to these enhanced security techniques. It is expected, for example, that one of the enhanced techniques will be a trace of the source of illicit material. That is, for example, future recording or providing systems may add a unique identifier to each provided material, identifying itself; for example, material downloaded from a web-site may contain that web-site name. When such material is determined to be illicit, the block 160 may provide a message such as: "This material has been illicitly obtained from site xxx.com, and the performers are being deprived of their royalty rights. Please refrain from purchasing material from xxx.com." In this manner, the unintentional purchaser of illicit material is advised of the nature of the product he or she is receiving from the identified site, and will seek another source for the desired material. Eventually, the identified providers of illicit material will lose their customer base to the authorized providers, and the economic infeasibility of providing such illicit material to a dwindling customer base will force the illicit operation to shut down. Also, advanced systems may be configured to communicate this information to a central authority, so that preventive measures may be taken to prevent future losses.

SUMMARY OF THE INVENTION

It is an object of this invention to improve the effectiveness of a phased approach to screening for illicit copies of copy-protected material.

This invention is based on the observation that, after some experience with the conventional phased approach of FIG. 1, the intentional users of illicitly obtained copies of copy-protected material will "spread the word", via, for example, the Internet, advising both the intentional users and unintentional users of illicit material of the perils associated with upgrading. Thereafter, a dwindling number of people will be expected to voluntarily upgrade their systems, and the phased approach to advanced security will likely fail.

The object of this invention is achieved by testing for the availability of an enhanced version of a screening system and forcing an upgrade to the advanced screening system when material that complies with the existing standards is being processed. When security standards change, and corresponding security techniques are available for downloading to existing consumer devices, newly published content material will contain an indication to that effect. When the newly published content material is processed by an existing consumer device, the consumer device will detect this indication of an available update, and will prevent the processing of this newly published content material until the update is received. In this manner, a phased approach to enhanced security can be effected.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DESCRIPTION OF THE PREFERRED EMBODIMENTS

As noted above in the Summary Of The Invention, the conventional approach to a phased upgrade of security measures, enforces the phased upgrade on users who attempt to play or otherwise process illicit copies of copy-protected material. That is, consistent with a non-intrusive approach to the enforcement of copy protection, the conventional approach does not impose a burden on the user until the user commits a wrong. Although this approach is minimally intrusive, it has the potential of being minimally effective. When wrong-doers determine that upgrading their system provide no benefit to them, they will cease such upgrades. Because messages can now be effectively communicated virtually worldwide to large portions of the population, the wrong-doers can also influence others, particularly unknowing wrong-doers, to also cease such upgrades. Thus, the conventional upgrade strategy of FIG. 1 that provides no tangible benefits for upgrading is likely to fail.

Figure 1:
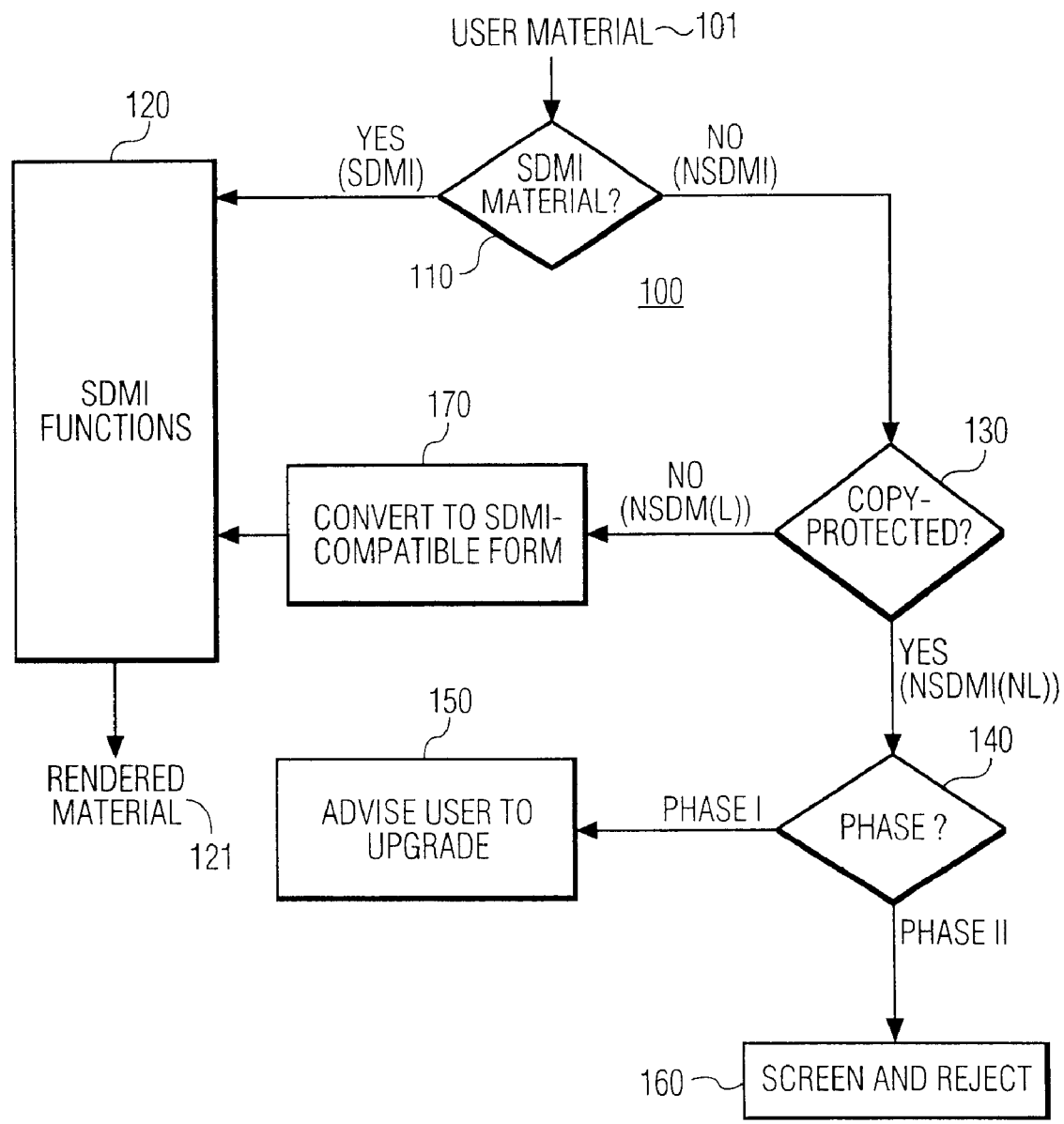
FIG. 1 illustrates an example conventional screening process for illicit copies of copy-protected content material.
Figure 2:
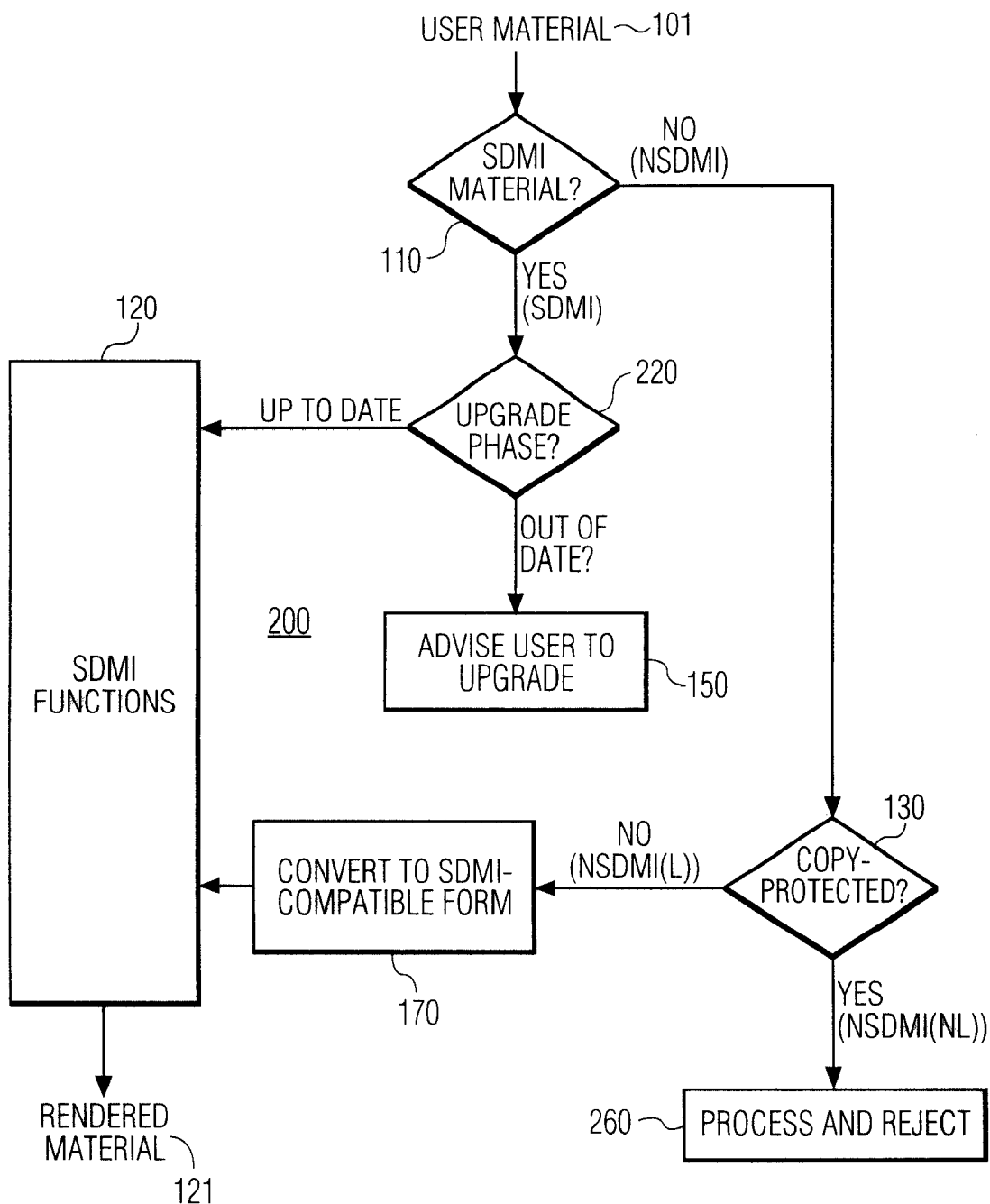
FIG. 2 illustrates an example screening process for illicit copies of copy-protected content material in accordance with this invention.

FIG. 2 illustrates an example alternative screening process 200 for illicit copies of copy-protected content material in accordance with this invention. This alternative screening process 200 does impose a burden on the users of legitimate copies of copy-protected material, but the burden is not considered to be overbearing. As in FIG. 1, the user material 101 is tested for the presence of an SDMI-authorization, at 110. If the material 101 is an SDMI-authorized copy of copy-protected material, the update status of the system is tested, at 220. The SDMI-authorized material includes an indication of the phase of the upgrade strategy that was in effect when the material 101 was generated. If the current state of the system is not up-to-date with this phase, the user is advised to upgrade the system, at 150. Alternatively, if the current state of the system is at the indicated phase, or at a higher phase, the system is up-to-date, and the SDMI-authorized material is provided to the SDMI functions 120 for rendering 121 or other processing.

By preventing access to the SDMI functions 120 when the system is determined to be out-of-date, the user's "incentive" for upgrading the system is the rendering of this new content material having the higher upgrade indication. In this manner, users are likely to continue to upgrade the system at each phase of a phased security-upgrade process. To ease the "surprise" factor associated with having to unexpectedly or inconveniently upgrade the system, the packaging of the content material could include an indication of the applicable upgrade level, and the user could effect the upgrade before attempting to render or otherwise process newly acquired content material. Alternative techniques, common in the art, may also be utilized, such as an automatic notification of new upgrades to users via e-mail messages, and the like.

As in the process of FIG. 1, legitimate copies of non-SDMI material (SDMI(L)), typically copies that do not have a copy-protection marking, such as a watermark, are identified at 130, and pre-processed for SDMI processing, at 170. Non-legitimate copies of non-SDMI material (SDMI(NL)), typically copies of content material having copy-protection marking but not an appropriate SDMI-authorization, are rejected for rendering or other processing, at 260. The processing will be dependent upon the current upgrade state the system. That is, for example, if the system has been upgraded to identify the source of the illicit material, the processing at 260 will include the "do not purchase material from xxx.com" messaging discussed above with regard to FIG. 1.

Figure 3:
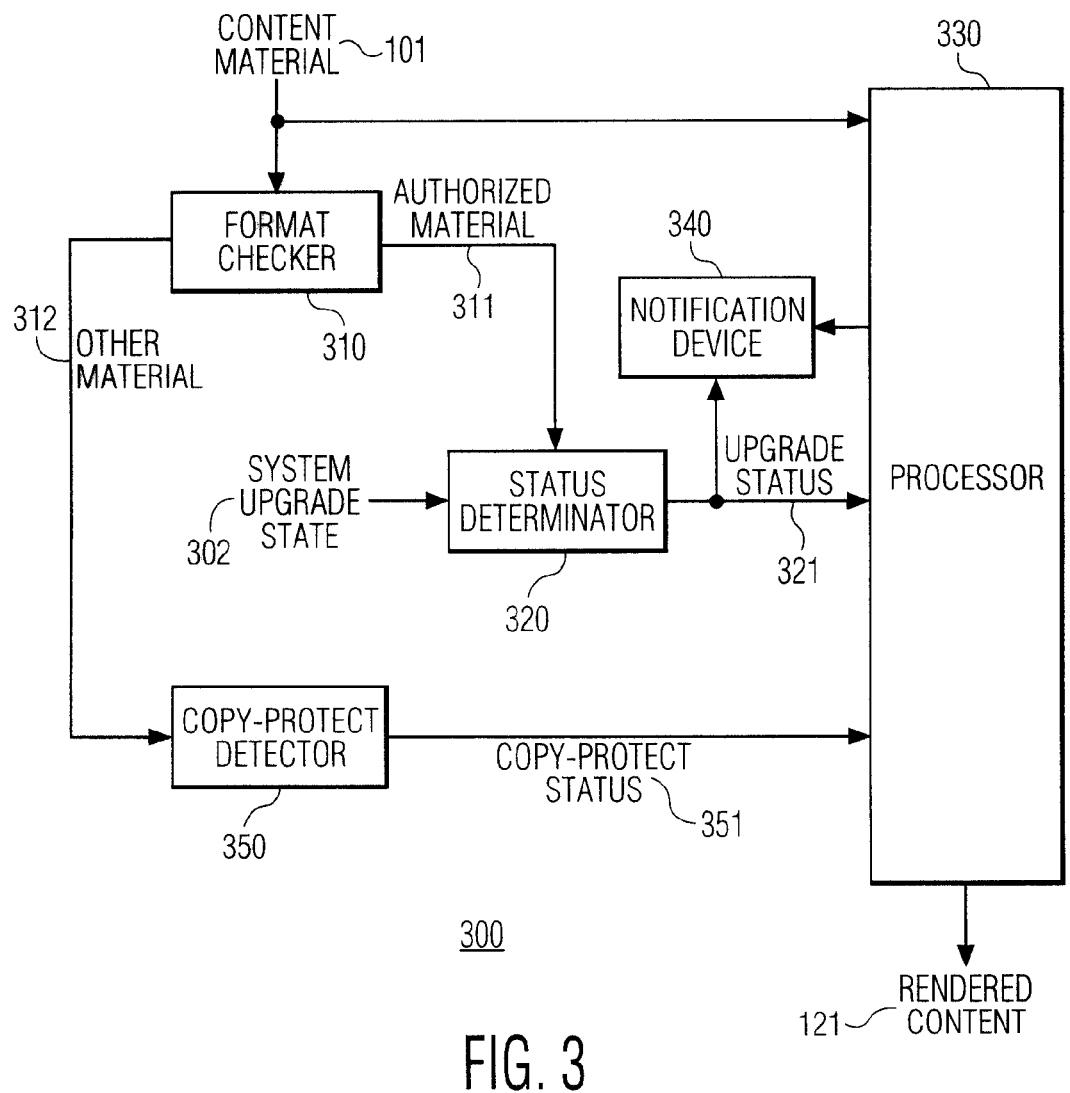
FIG. 3 illustrates an example block diagram of a system for screening for illicit copies of copy-protected content material in accordance with this invention.

FIG. 3 illustrates an example block diagram of a system 300 for identifying illicit copies of copy-protected content material in accordance with this invention. A format checker 310 checks the content material 101 to determine whether the material is authorized content material, using for example, standards established by the SDMI. A status determinator 320 extracts an upgrade status indicator from the authorized content material 311, and compares it to a system upgrade state 302, to produce an upgrade status 321. As noted above, the upgrade status indicator is associated with the content material 101, preferably cryptographically bound to the material 101, and indicates a version of upgrade that is available for the system. This version indicator is typically the latest version of the upgrade that was available when the content material 101 was created. In the context of this invention, the upgrade version indicator facilitates an identification of a new phase of copy-protection in a copy-protection system, although the principles presented herein can be applied for other upgrade strategies and applications as well. Note that, in a conventional upgrade process, such as illustrated in FIG. 1, the upgrade status indicator is encoded as an "in-band" signal relative to the content material. That is, the status indicator is conventionally encoded within the content material, so that it cannot be easily removed from the material. In accordance with this invention, on the other hand, the status indicator is determined after the content material is verified as being authorized, and there is little or no incentive to remove it. Alternatively, the format checker 310 can be configured to assure that a status indicator is present before declaring that the material is authorized. Thus, the status indicator in this invention can be encoded as an out-of-band signal, which, as is commonly known in the art, is often easier to extract and determine than a conventional in-band signal. As a further measure of security, the status indicator in a preferred embodiment is bound to the content material, using a digital signing technique or similar security measure.

A processor 330 processes the content material 101 in dependence upon the upgrade status 321. If the system upgrade state 302 is at the level determined from the upgrade status indicator associated with the content material 101, or higher, the processor 330 processes the content material 101 to provide a rendered output 121. Note that an acceptable upgrade status 321 is only produced from authorized content material 311. The upgrade status 321 is also provided to a notification device 340 that notifies a user when the system 300 is out-of-date relative to the status indicator included with the content material 101.

If the content material 101 is not-authorized 312, that does not necessarily imply that the material is illegitimate. A copy-protection detector 350 is configured to detect the presence of a copy-protection scheme, such as a watermark, on the not-authorized content material 312. If the not-authorized material 312 contains a copy-protection mark, then it must be an illicit copy of copy-protected material, and the processor 330 is configured to prevent the rendering or other processing of the content material 101 if the copy-protection flag 351 is asserted, and, optionally, to utilize the notification device 340 to recommend an upgrade. Conversely, if the not-authorized material 312 does not contain a copy-protection mark, the copy-protection detector 350 does not assert the copy-protection flag, and the processor 330 renders or otherwise processes the content material 101 without constraint.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the test block 220 or the processor 330 may be structured to allow the user material 101 to be rendered or otherwise processed for a limited number of times before preventing such rendering or other processing based on an out-of-date upgrade. That is, the system will display a message indicating that the system needs to be updated, and will cease to render the higher-upgrade-status content material after the next 5 plays. Contrarily, the test block 220 or the processor 330 may be structured to prevent any subsequent processing of content material 101 upon the first determination of an outdated upgrade status. That is, the test block 220 could prohibit subsequent access to the functions 120 regardless of the upgrade indicator on subsequent user material 101. Combinations of these approaches, and others, will be evident to one of ordinary skill in the art. These and other system configuration and optimization features will be evident to one of ordinary skill in the art in view of this disclosure, and are included within the scope of the following claims.

I claim:

1. A method for screening content material that facilitates a phased approach to enhanced security, the method comprising the steps:

checking the content material for compliance with a copy-protection standard to identify authorized content material;

determining an upgrade indicator that is associated with the authorized content material;

determining an upgrade state of programming code that is associated with this method of screening content material; and processing the authorized content material only when the upgrade state corresponds to the upgrade indicator, wherein the method further comprises the steps:

determining an authorization of the content material that does not comply with the copy-protection standard; and processing the content material that does not comply with the copy-protection standard when the authorization is affirmative.

2. The method as claimed in claim 1, wherein the determining of the upgrade indicator is facilitated by an out-of-band signaling of the upgrade indicator.

3. The method as claimed in claim 2, wherein the out-of-band signaling is bound to the content material using a cryptographic technique.

4. The method as claimed in claim 3, wherein the cryptographic technique includes a digital signing.

5. A system for processing content material that facilitates a phased approach to enhanced security, the system comprising:

a format checker for identifying authorized content material based on compliance of the content material with a copy-protection standard;

a status determinator for determining an upgrade status associated with the system based on an upgrade indicator that is associated with the authorized content material and an upgrade state of the system; and a processor for processing the authorized content material in dependence upon the upgrade status, wherein said system further comprises:

a copy-protect detector for determining an authorization of the content material that does not comply with the copy-protection standard, and wherein the processor further processes the content material that does not comply with the copy-protection standard when the authorization is affirmative.

6. The system as claimed in claim 5, wherein the upgrade indicator corresponds to an out-of-band signaling, relative to the content material.

7. The system as claimed in claim 6, wherein the out-of-band signaling is bound to the content material using a cryptographic technique.

8. The system as claimed in claim 7, wherein the cryptographic technique includes a digital signing.

* * * * *